United States Patent
Yang et al.

(10) Patent No.: US 11,192,964 B2
(45) Date of Patent: Dec. 7, 2021

(54) IONIC LIQUID SHALE INHIBITOR FOR DRILLING FLUID AND PREPARATION METHOD AND APPLICATION THEREOF

(71) Applicant: China University of Petroleum (Beijing), Beijing (CN)

(72) Inventors: Lili Yang, Beijing (CN); Guancheng Jiang, Beijing (CN); Xiao Yang, Beijing (CN); Tengda Wang, Beijing (CN); Yawei Shi, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 0 days.

(21) Appl. No.: 17/084,262

(22) Filed: Oct. 29, 2020

(65) Prior Publication Data
US 2021/0122851 A1 Apr. 29, 2021

(30) Foreign Application Priority Data
Oct. 29, 2019 (CN) .......................... 201911039770.6

(51) Int. Cl.
*C09K 8/035* (2006.01)
*C08F 26/06* (2006.01)

(52) U.S. Cl.
CPC .............. *C08F 26/06* (2013.01); *C09K 8/035* (2013.01); *C08F 2438/01* (2013.01); *C08F 2438/03* (2013.01); *C09K 2208/12* (2013.01)

(58) Field of Classification Search
CPC .. C08F 26/06; C08F 2438/01; C08F 2438/03; C09K 8/035; C09K 2208/12
See application file for complete search history.

(56) References Cited

U.S. PATENT DOCUMENTS 4,324,684 A * 4/1982 Geiger .................... C23F 11/08
106/14.11

FOREIGN PATENT DOCUMENTS

| CN | 101235278 A | 8/2008 |
| CN | 104497994 A | 4/2015 |
| CN | 106732779 A | 5/2017 |

OTHER PUBLICATIONS

L. Yang, et al, Application of ionic liquid and polymeric ionic liquid as shale hydration inhibitors, Energy Fuels, 2017, 31, 4308-4317.*
J. C. Salamone, et al, Syntheisis and homopolymerization studies of vinylimidazolium salts, Polymer, 1973, 14, 639-644.*
B. Zhang, et al., Efficient heterogeneous functionalized polymer ionic liquid catalyst for the synthesis of ethylene carbonate via the coupling of carbon dioxide with ethylene oxide, RSC Adv., 2014, 4, 20506-20515.*

* cited by examiner

*Primary Examiner* — Kumar R Bhushan
(74) *Attorney, Agent, or Firm* — Calfee Halter & Griswold LLP

(57) ABSTRACT

A preparation method of an ionic liquid shale inhibitor for drilling fluid comprises the following step: subjecting the imidazole-based ionic liquid to a polymerization reaction in water environment under an inert atmosphere, and the produced polymer is used as an ionic liquid shale inhibitor for drilling fluid. The ionic liquid shale inhibitor for drilling fluid has the advantages of desirable inhibition effect, good compatibility, strong high-temperature resistance, simple preparation method and low cost.

13 Claims, No Drawings

IONIC LIQUID SHALE INHIBITOR FOR DRILLING FLUID AND PREPARATION METHOD AND APPLICATION THEREOF

CROSS REFERENCE TO RELATED APPLICATIONS

The present application claims priority to Chinese Patent Application No. CN201911039770.6, filed on Oct. 29, 2019, which is hereby specifically and entirely incorporated by reference.

FIELD

The present disclosure relates to the field of drilling fluid, and particularly relates to an ionic liquid shale inhibitor for drilling fluid, and a preparation method and an application thereof.

BACKGROUND

The potential of conventional oil and gas resources in the People's Republic of China (PRC) is increasingly reduced along with the exploration and development of domestic oil and gas resources, thus the exploratory development of unconventional oil and gas reservoirs become the focus of the domestic companies, and the exploitation of oil and gas reservoirs in the shale stratum is one of the research priorities. When the water-based drilling fluid is utilized in the drilling process of a shale stratum, the shale is inevitably hydrated and expanded, so that the accidents such as hole shrinkage, sticking of drilling tool, and well collapse are easily caused by unstable borehole walls, thereby prolonging the drilling time and increasing the construction costs, as a result, the oil-based drilling fluid is generally used in the drilling of shale stratum. However, the oil-based drilling fluid requires high costs and is prone to cause serious environmental protection problems, the relevant costs are greatly increased once the borehole leakage occurs; given that the environmental protection has attracted increasingly concerns at home and abroad, the importance of an environment-friendly drilling fluid system is continuously improved, thus it is extremely urgent to research a water-based drilling fluid system which is environment-friendly and has superior performance comparable to the oil-based drilling fluid, but the core treating agent (i.e., a water-based shale inhibitor) of the water-based drilling fluid system has become a "bottleneck" which restrains the exploration and development of shale reservoirs.

There are a wide range of inhibitors used in the oil fields, and the properties of each type of inhibitor are different. The inhibitors with potassium ions can effectively inhibit expansion of shale, but their working concentration is high, and may impose adverse influence on the environment; the inhibitors with ammonium cation ammonium salts are relatively cheap and can be mixed with other acids or anion substances for use, but the inhibitors have the disadvantages that the inhibition time is short, the temperature resistance is poor, and the ammonium cation ammonium salts are easily decomposed into ammonia under the condition of high pH; the inhibitors with quaternary ammonium salt are influenced by the pH, and have desirable efficacy when used at a low pH, but the inhibitors have serious toxicity, and are prone to generate flocculation action when the solid phase content in the drilling fluid is high, and have poorer compatibility with an anion treating agent; the inhibitors with polyamine acid are completely water-soluble, have excellent thermal stability, are not easily hydrolyzed, and exhibit desirable compatibility with other treating agents, can effectively inhibit hydration of the shale, but cannot dewater the hydrated shale; when the drilling fluid contains a large amount of high-activity solid phase, the inhibition effect is poor; the diamines with high molecular weights have poor solubility in water, the monoamine with high molecular weights has poor inhibitive performance, the diamines with low molecular weights are toxic and odorous; the polyethoxy diamine has the characteristics of low toxicity and less ammonia odor, but its shale inhibition capability is poorer than that of an ordinary inhibitor.

SUMMARY

The present disclosure aims to solve the problems of environmental unfriendliness of oil-based drilling fluids and poor inhibition performance of water-based drilling fluids in the prior art, and provides an ionic liquid shale inhibitor for drilling fluid and a preparation method and an application thereof. The ionic liquid shale inhibitor for drilling fluid has the advantages of desirable inhibition effect, good compatibility, strong high-temperature resistance, simple preparation method and low cost.

The inventors of the present disclosure have discovered that the imidazole-based ionic liquid can surprisingly play a satisfactory role of an inhibitor when applied to the drilling fluid after being subjected to polymerization modification. Through a great deal of researches, the structure of the imidazole ionic liquid is preferably selected, thereby obtaining the inhibitive performance which is obviously more excellent than that of the existing inhibitors.

In a first aspect, the present disclosure provides a method of preparing an ionic liquid shale inhibitor for drilling fluid, the method comprising: subjecting the imidazole-based ionic liquid to a polymerization reaction under an inert atmosphere, the produced polymer is used as an ionic liquid shale inhibitor for drilling fluid.

In a second aspect, the present disclosure provides a polymer obtained from the preparation method of the first aspect of the present disclosure.

In a third aspect, the present disclosure provides an application of a polymer according to the second aspect of the present disclosure as an ionic liquid shale inhibitor for drilling fluid.

Compared with the existing ionic liquid shale inhibitor for drilling fluids, the ionic liquid shale inhibitor for drilling fluid at least has the following advantages:

(1) the high-temperature resistance is strong: the inhibitor has a degradation temperature above 270° C.;

(2) the inhibition effect is desirable: the inhibitor has desirable inhibition effect, and the linear expansion evaluation height at normal temperature is less than 3 mm; the capability of inhibiting slurrying of bentonite is strong, and the viscosity is not basically increased when the content of the bentonite is below 28%; the recovery rate of the rolling recovery evaluation result at 120° C. may reach 75%;

(3) the compatibility is good, it does not interfere with other reagents, and the properties of the drilling fluid is basically unaffected;

(4) the preparation method is simple, can be easily implemented, the reagents in use have low cost, and the prepared drilling fluid are suitable for large-scale field application.

The additional features and advantages of the present disclosure will be specified in the subsequent content in the detailed description.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a method of preparing an ionic liquid shale inhibitor for drilling fluid, the method comprising the following steps: subjecting the imidazole-based ionic liquid to a polymerization reaction in water environment under an inert atmosphere, the produced polymer is used as an ionic liquid shale inhibitor for drilling fluid.

In the present disclosure, the term "ionic liquid" has the same meaning as the conventional meaning in the art, i.e., a liquid consisting entirely of anions and cations at room temperature or near room temperature. The term "imidazole-based ionic liquid" has the same meaning as the conventional meaning in the art, i.e., it refers to an ionic liquid in which the structure of the cation contains imidazole rings.

According to the method of the present disclosure, the imidazole-based ionic liquid is subjected to polymerization modification, so that the product can be used as an ionic liquid shale inhibitor for drilling fluid and can play an excellent inhibition effect.

Furthermore, the inventors of the present disclosure have performed an optimization selection in regard to the structure of the ionic liquid in order to ensure a superior inhibition effect. According to a preferred embodiment of the present disclosure, the imidazole-based ionic liquid comprises a cationic monomer and an anionic monomer, wherein the cationic monomer has a structural formula

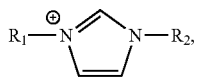

wherein $R_1$ and $R_2$ are respectively and independently selected from $C_2$-$C_8$ substituted or unsubstituted alkyl or alkenyl, and the total number of double bonds contained in $R_1$ and $R_2$ is within a range of 1-4.

According to the method of the present disclosure, $R_1$ and $R_2$ are independently selected from $C_2$-$C_8$ alkyl or alkenyl, and the $C_2$-$C_8$ alkyl or alkenyl may be substituted or unsubstituted, preferably unsubstituted.

In the following preferred embodiments of the method according to the first aspect of the present disclosure, both $R_1$ and $R_2$ are selected to be unsubstituted groups merely consisting of carbon atoms and hydrogen atoms.

According to the method of the present disclosure, preferably, $R_1$ contains a double bond and $R_2$ does not contain a double bond.

According to the method of the present disclosure, it is preferable that $R_1$ and $R_2$ are linear chains.

According to the method of the present disclosure, $R_1$ is selected from $C_2$-$C_8$ alkenyl, $R_2$ is selected from $C_2$-$C_8$ alkyl; further preferably, $R_1$ is selected from $C_2$-$C_8$ linear alkenyl, and $R_2$ is selected from $C_2$-$C_8$ linear alkyl.

According to the process of the present disclosure, preferably, $R_1$ is selected from $C_2$-$C_8$ alkenyl; more preferably, $R_1$ is selected from $C_2$-$C_7$ alkenyl; more preferably, $R_1$ is selected from $C_2$-$C_6$ alkenyl; more preferably, $R_1$ is selected from $C_2$-$C_5$ alkenyl; further preferably, $R_1$ is selected from $C_2$-$C_4$ alkenyl (it is enumerated as —CH=CH—CH$_2$—CH$_3$, —CH$_2$—CH=CH—CH$_3$, —CH$_2$—CH$_2$—CH=CH$_2$, —CH=CH—CH=CH$_2$, —C(CH$_3$)=CH—CH$_3$, —CH=C(CH$_3$)$_2$, —(CH$_2$)$_2$—CH=CH$_2$, —CH$_2$—C(CH$_3$)=CH$_2$, —CH=CH—CH$_3$, —CH$_2$—CH=CH$_2$, —C(CH$_3$)=CH$_2$ and —CH=CH$_2$); more preferably, $R_1$ is selected from —CH=CH—CH$_2$—CH$_3$, —CH$_2$—CH=CH—CH$_3$, —CH$_2$—CH$_2$—CH=CH$_2$, —CH=CH—CH=CH$_2$, —CH=CH—CH$_3$, —CH$_2$—CH=CH$_2$ and —CH=CH$_2$; more preferably, $R_1$ is selected from —CH=CH—CH$_3$, —CH=CH—CH$_2$—CH$_3$ and —CH=CH; most preferably, $R_1$ is —CH=CH$_2$.

According to the method of the present disclosure, preferably, $R_2$ is selected from the group consisting of $C_2$-$C_8$ alkyl; more preferably, $R_2$ is selected from the group consisting of $C_2$-$C_7$ alkyl; more preferably, $R_2$ is selected from the group consisting of $C_2$-$C_6$ alkyl; more preferably, $R_2$ is selected from the group consisting of $C_2$-$C_5$ alkyl; more preferably, $R_2$ is selected from the group consisting of $C_2$-$C_4$ alkyl (it is enumerated as —CH$_2$—CH$_2$—CH$_2$—CH$_3$, —CH$_2$—CH(CH$_3$)$_2$, —C(CH$_3$)$_2$—CH$_3$, —CH$_2$—CH$_2$—CH$_3$, —CH(CH$_3$)$_2$, —CH(CH$_3$)—CH$_3$ and —CH$_2$—CH$_3$); more preferably, $R_2$ is selected from the group consisting of —CH$_2$—CH$_2$—CH$_2$—CH$_3$, —CH$_2$—CH$_2$—CH$_3$ and —CH$_2$—CH$_3$; most preferably, $R_2$ is —CH$_2$—CH$_2$—CH$_2$—CH$_3$ or —CH$_2$—CH$_3$.

According to the method of the present disclosure, $R_1$ and $R_2$ in the cationic monomer

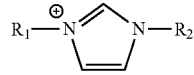

are selected from one of the following combinations of structural formula:

| | |
|---|---|
| $R_1$ is —CH=CH$_2$, $R_2$ is —CH$_2$—CH$_3$; | (Formula 1') |
| $R_1$ is —CH=CH$_2$, $R_2$ is —CH$_2$—CH$_2$—CH$_2$—CH$_3$; | (Formula 2') |
| $R_1$ is —CH=CH$_2$, $R_2$ is —CH$_2$—CH$_2$—CH$_3$; | (Formula 3') |
| $R_1$ is —CH=CH$_2$, $R_2$ is —CH(CH$_3$)—CH$_3$; | (Formula 4') |
| $R_1$ is —CH=CH$_2$, $R_2$ is —CH(CH$_3$)$_2$; | (Formula 5') |
| $R_1$ is —CH=CH$_2$, $R_2$ is —CH$_2$—CH(CH$_3$)$_2$; | (Formula 6') |
| $R_1$ is —CH=CH$_2$, $R_2$ is —C(CH$_3$)$_2$—CH$_3$; | (Formula 7') |
| $R_1$ is —CH=CH—CH$_3$, $R_2$ is —CH$_2$—CH$_3$; | (Formula 8') |
| $R_1$ is —C(CH$_3$)=CH$_2$, $R_2$ is —CH$_2$—CH$_3$; | (Formula 9') |
| $R_1$ is —CH$_2$—CH=CH$_2$, $R_2$ is —CH$_2$—CH$_3$; | (Formula 10') |
| $R_1$ is —CH$_2$—C(CH$_3$)=CH$_2$, $R_2$ is —CH$_2$—CH$_3$; | (Formula 11') |
| $R_1$ is —(CH$_2$)$_2$—CH=CH$_2$, $R_2$ is —CH$_2$—CH$_3$; | (Formula 12') |
| $R_1$ is —CH=C(CH$_3$)$_2$, $R_2$ is —CH$_2$—CH$_3$; | (Formula 13') |
| $R_1$ is —C(CH$_3$)=CH—CH$_3$, $R_2$ is —CH$_2$—CH$_3$; | (Formula 14') |

$R_1$ is —CH=CH—CH=CH$_2$, $R_2$ is —CH$_2$—CH$_3$;  (Formula 15')

$R_1$ is —CH$_2$—CH$_2$—CH=CH$_2$, $R_2$ is —CH$_2$—CH$_3$;  (Formula 16')

$R_1$ is —CH$_2$—CH=CH—CH$_3$, $R_2$ is —CH$_2$—CH$_3$;  (Formula 17')

$R_1$ is —CH=CH—CH$_2$—CH$_3$, $R_2$ is —CH$_2$—CH$_3$;  (Formula 18')

$R_1$ is —CH=CH—CH$_3$, $R_2$ is —CH$_2$—CH$_2$—CH$_2$—CH$_3$;  (Formula 19')

$R_1$ is —CH=CH—CH$_3$, $R_2$ is —CH$_2$—CH$_2$—CH$_3$;  (Formula 20')

$R_1$ is —CH$_2$—CH=CH$_2$, $R_2$ is —CH$_2$—CH$_2$—CH$_2$—CH$_3$;  (Formula 21')

$R_1$ is —CH$_2$—CH=CH$_2$, $R_2$ is —CH$_2$—CH$_2$—CH$_3$;  (Formula 22')

$R_1$ is —CH=CH$_2$, $R_2$ is —CH=CH$_2$;  (Formula 23')

$R_1$ is —CH$_2$—CH$_3$, $R_2$ is —CH=CH$_2$.  (Formula 24')

According to the method of the present disclosure, the anionic monomer may be an anionic monomer commonly used in imidazole-based ionic liquids of the art, for example, the anionic monomer may be one or more selected from the group consisting of halide ion, fluorine-containing inorganic acid ion, fluorine-containing imine ion, carbonate ion and bicarbonate ion; preferably, the anionic monomer is one or more selected from the group consisting of hexafluorophosphate ion, tetrafluoroborate ion, bis(trifluoromethane sulfonamide) ion, bromide ion, iodide ion, fluoride ion, chloride ion and bicarbonate ion; more preferably, the anionic monomer is one or more selected from the group consisting of bromide ion, iodide ion, fluoride ion, chloride ion, tetrafluoroborate ion and hexafluorophosphate ion; further preferably, the anionic monomer is one or more selected from the group consisting of bromide ion, iodide ion and chloride ion; most preferably, the anionic monomer is bromide ion.

According to the most preferred embodiment of the ionic liquid according to the present disclosure, $R_1$ is vinyl, $R_2$ is ethyl or butyl, and the anionic monomer is bromide ion.

According to the method of the present disclosure, the ionic liquid may be commercially available, but more preferably, it is obtained by preparation.

According to the method of the present disclosure, the ionic liquid is preferably obtained through the following process: subjecting a raw material A and a raw material B to a contact reaction under an inert atmosphere, wherein the structural formula of the raw material A is

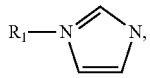

the structural formula of the raw material B is $R_2R_3$, $R_1$ and $R_2$ are selected according to the structural formula

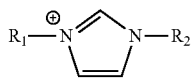

of a cationic monomer of the ionic liquid to be prepared, and $R_3$ is selected according to an anionic monomer of the ionic liquid to be prepared. Specific choices of $R_1$, $R_2$ and $R_3$ are made in accordance with the above description set forth herein.

In the above method for preparing an ionic liquid, it should be noted that $R_1$ in the raw material A is corresponding to $R_1$ in the Formula

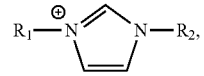

and $R_2$ in the raw material B is corresponding to $R_2$ in the Formula

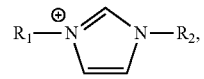

the $R_1$ and $R_2$ cannot be exchanged due to the structural symmetry of $R_1$ and $R_2$ in the Formula

That is, as described above, $R_1$ preferably has structure containing one or more double bonds, and $R_2$ preferably has a structure which does not contain a double bond, that is, $R_2R_3$ does not comprise a double bond. For another example, assuming that $R_1$ is vinyl and $R_2R_3$ is bromoethane in equation I, the prepared ionic liquid is denoted as I; assuming that $R_1$ is ethyl and $R_2R_3$ is vinyl bromide in the equation II, the prepared ionic liquid is denoted as II; the properties of ionic liquid I and ionic liquid II are slightly different, although their inhibitory effects are desirable, the inhibitory effect of ionic liquid I is more excellent.

In the aforementioned method for preparing an ionic liquid, the molar ratio of the raw material A relative to the raw material B is preferably 1:0.5-2, more preferably 1:0.8-1.2, further preferably 1:0.9-1.1.

In the above method for preparing an ionic liquid, it is preferable that the conditions of the contact reaction comprise: the reaction temperature is within a range of 50-90° C., preferably 60-80° C., more preferably 65-75° C., and further preferably 68-72° C.; the reaction time is within a range of 2-5 days, preferably 2-3 days.

In the aforementioned method for preparing ionic liquid, the contacting is preferably performed under the stirring condition, and the stirring can be implemented under the condition of ensuring sufficient contact of materials, for example, under the condition of mechanical stirring at a rotational speed of 150-250 rpm.

In the above method for preparing the ionic liquid, the inert atmosphere refers to protection with a gas which does not react with other materials, for example, the reaction is carried out under the protection of nitrogen.

In the above method for preparing an ionic liquid, it is preferable that the preparation process further comprises: purifying and drying the material obtained by the contact reaction so as to prepare the ionic liquid.

Wherein the purifying mode preferably comprises the following steps: performing rotary evaporation and purification with ether and/or petroleum ether (preferably for a time period of 1-2 days).

The drying may be, for example, vacuum drying for 2-3 days.

According to the method of the present disclosure, the method preferably comprises: initially dissolving the imidazole-based ionic liquid in water, and then carrying out the polymerization reaction in an inert atmosphere; namely, the aqueous solution of the imidazole ionic liquid is initially prepared and the polymerization reaction is subsequently carried out.

Preferably, the weight ratio of the imidazole-based ionic liquid relative to water is within a range of 1: 3-10, more preferably 1: 3-6, further preferably 1: 3-5.

Preferably, the method further comprises: before the polymerization reaction is carried out, an inert gas is introduced into the mixed solution of the ionic liquid and the water to remove oxygen; preferably, the process of removing oxygen comprises: the mixed solution of the ionic liquid and water is heated to lower the solubility of oxygen (for example, the oxygen is substantially removed by heating to 30-90° C., generally to 30-50° C.), and an inert gas (e.g., nitrogen) is introduced while stirring for 20-60 minutes (in general, the oxygen is substantially removed by introducing the inert gas for 25-35 minutes).

According to the method of the present disclosure, the polymerization reaction mode may be various conventional polymerization reaction modes in the art, it is preferable that the polymerization reaction mode of the ionic liquid of the present disclosure is selected from the group consisting of a free radical polymerization, a RAFT polymerization (i.e., the general abbreviation of "reversible addition-fragmentation chain transfer polymerization" in the art) and an ATRP polymerization (i.e., the general abbreviation of "atom transfer radical polymerization reaction" in the art); the effects of the inhibitors prepared by the three polymerization reaction methods are not significantly different, the skilled person in the art may select the polymerization reaction mode according to the practical condition, and generally, the operation method of the free radical polymerization is simple and can be taken as a preferable method.

When the free radical polymerization mode is adopted, in order to make the ionic liquid to be more suitable for the present disclosure and have better polymerization effect, the process of the free radical polymerization comprises the following steps: the ionic liquid is polymerized for 2-4 hours (preferably 3-4 hours) at a temperature of 60-80° C. (preferably 65-75° C.) in the presence of a free radical initiator.

In the free radical polymerization, the used amount of the free radical initiator may vary within a wide range, in order to make the ionic liquid to be more suitable for the present disclosure and have better polymerization effect, it is preferable that the molar ratio of the ionic liquid relative to the free radical initiator is 100:0.05-10, more preferably 100:0.1 to 5, further preferably 100:0.1-2.

In the free radical polymerization, the choice of the free radical initiator may be the conventional selection of the free radical reaction, however, for the sake of making the ionic liquid to be more suitable for the present disclosure and have better polymerization effect, the free radical initiator is preferably one or more selected from the group consisting of potassium persulfate, sodium persulfate, a composition of ammonium persulfate and sodium sulfite (the molar ratio is 1:0.5-1), a composition of ammonium persulfate and ferrous sulfate (the molar ratio is 1:0.5-1), 2,2'-azobisisobutyronitrile, 2,2'-azobisisoheptonitrile and 2,2'-[azobis(1-methylethylidene)]bis[4,5-dihydro-1H-imidazole dihydrochloride.

When the RAFT polymerization mode is adopted, for the sake of making the ionic liquid to be more suitable for the present disclosure and have better polymerization effect, the process of the RAFT polymerization preferably comprises: subjecting the ionic liquid to the polymerization reaction in a sealed environment at the temperature of 70-90° C. (preferably 75-85° C.) for 5-8 h (preferably 6-7 h) under an inert atmosphere and in the presence of a RAFT initiator and a chain transfer agent.

In the RAFT polymerization the used amount of RAFT initiator used may vary within a wide range, for the sake of making the ionic liquid to be more suitable for the present disclosure and have better polymerization effect, the molar ratio of the ionic liquid relative to the RAFT initiator is preferably 100:0.05-10, more preferably 100:0.5-8, further preferably 100: 3-4.

In the RAFT polymerization, the choice of the RAFT initiator may be a conventional selection of the RAFT polymerization, for the sake of making the ionic liquid to be more suitable for the present disclosure and have better polymerization effect, the RAFT initiator is preferably one or more selected from 2,2'-azobisisobutyronitrile, 2,2'-azobisisoheptonitrile, potassium persulfate and dibenzoyl peroxide.

In the RAFT polymerization, the used amount of the chain transfer agent may vary within a wide range, for the sake of making the ionic liquid to be more suitable for the present disclosure and have better polymerization effect, the molar ratio of the ionic liquid relative to the chain transfer agent is preferably 100:0.03-0.3, more preferably 100:0.05-0.25, further preferably 100:0.05-0.1.

In the RAFT polymerization, the selection of the chain transfer agent may be the conventional choice of the RAFT polymerization, for the sake of making the ionic liquid to be more suitable for the present disclosure and have better polymerization effect, the chain transfer agent is preferably one or more selected from trithiocarbonate, dithioformate and dithiocarbamate.

When the ATRP polymerization mode is adopted, for the sake of making the ionic liquid to be more suitable for the present disclosure and have better polymerization effect, the process of the ATRP polymerization preferably comprises: subjecting the ionic liquid to the polymerization reaction in a sealed environment at the temperature of 70-90° C. (preferably 75-85° C.) for 5-8 h (preferably 6-7 h) under an inert atmosphere and in the presence of an ATRP initiator, a catalyst and a complexing agent.

In the ATRP polymerization, the used amount of the ATRP initiator may vary within a wide range, for the sake of making the ionic liquid to be more suitable for the present disclosure and have better polymerization effect, the molar ratio of the ionic liquid relative to the ATRP initiator is preferably 100:0.05-10, more preferably 100:0.1-5, further preferably 100: 1-3.

In the ATRP polymerization, the ATRP initiator may be selected from the conventional choice of the ATRP polymerization, for the sake of making the ionic liquid to be more suitable for the present disclosure and have better polymerization effect, the ATRP initiator is preferably one or more selected from benzyl halide, α-bromo ester, α-haloketone, α-halonitrile, aryl sulfonyl chloride and 2,2'-azobisisobutyronitrile.

In the ATRP polymerization, the used amount of the catalyst may vary within a wide range, for the sake of making the ionic liquid to be more suitable for the present disclosure and have better polymerization effect, it is preferable that the molar ratio of the ionic liquid relative to the catalyst is 100:0.05-1, more preferably 100:0.1-0.5, and further preferably 100:0.2-0.4.

In the ATRP polymerization, the selection of the catalyst can be the conventional choice of the ATRP polymerization, for the sake of making the ionic liquid to be more suitable for the present disclosure and have better polymerization effect, the catalyst is preferably one or more selected from cuprous chloride, cuprous bromide, ferrous chloride and ferrous bromide.

In the ATRP polymerization, the used amount of the complexing agent may vary within a wide range, for the sake of making the ionic liquid to be more suitable for the present disclosure and have better polymerization effect, it is preferable that the molar ratio of the ionic liquid relative to the complexing agent is 100:0.05-0.6, more preferably 100:0.1-0.3, further preferably 100:0.15-0.25.

In the ATRP polymerization, the selection of the complexing agent may be the conventional choice of the ATRP polymerization, for the sake of making the ionic liquid to be more suitable for the present disclosure and have better polymerization effect, the complexing agent is preferably one or more selected from 2,2'-bipyridine, p-isopropyltoluene, cyclopentadiene, phenol and formic acid.

According to the method of the present disclosure, the method may further include: after the polymerization reaction is performed, drying the material obtained by the polymerization reaction so as to prepare the ionic liquid shale inhibitor for drilling fluid.

In a second aspect, the present disclosure provides a polymer obtained from the preparation method of the first aspect of the present disclosure.

Preferably, the polymer has a degree of polymerization within a range of 40-200 and a viscosity of (2-10) mPa·s at a temperature of 25° C.

In a third aspect, the present disclosure provides an application of a polymer according to the second aspect of the present disclosure as an ionic liquid shale inhibitor for drilling fluid.

The ionic liquid shale inhibitor for drilling fluids of the present disclosure are more preferably suitable for use in the water-based drilling fluids as the water-based shale inhibitors.

The present disclosure will be described in detail below with reference to examples.

Examples 1A-3A were provided to illustrate the method of modifying an ionic liquid by a free radical polymerization.

Example 1A (1) Preparation of an ionic liquid: a raw material A (with a structure represented by the formula

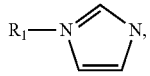

wherein $R_1$ is vinyl) and a raw material B (with a structure of $R_2R_3$, wherein $R_2$ is ethyl, and R3 is bromine) having a molar ratio of 1:1 were added into a three-neck flask, the ingredients were heated to 70° C. under the protection of nitrogen and subjected to contact reaction for 4 days under the condition of mechanical stirring at a rotational speed of 200 rpm, the mixture was taken out and subjected to rotary evaporation and purification by using ether for 2 days, and vacuum drying for 3 days, so as to obtain the ionic liquid.

(2) The ionic liquid obtained in the step (1) was dissolved in the deionized water according to a weight ratio of 1:4, the solution was then heated to 40° C., and nitrogen was introduced for 30 minutes under the stirring condition to completely remove oxygen.

(3) The polymerization reaction was performed with a free radical polymerization method: nitrogen was continuously introduced, a mixture of initiator ammonium persulfate and ferrous sulfate (with the molar ratio is 1:1) was added into the reactor, wherein the molar ratio of the addition amount of the initiator relative to the raw material A was 1:100, the substances were blended at the stirring speed of 170 rpm and heated to 70° C., and subjected to reaction for 3 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 1A.

Example 2A

The steps (1) and (2) of the Example 2A were identical with those in Example 1A.

(3) The polymerization reaction was performed with a free radical polymerization method: nitrogen was continuously introduced, a mixture of initiator ammonium persulfate and sodium sulfite (with the molar ratio is 1:1) was added into the reactor, wherein the molar ratio of the addition amount of the initiator relative to the raw material A was 0.1:100, the substances were blended at the stirring speed of 170 rpm and heated to 70° C., and subjected to reaction for 4 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 2A.

Example 3A

The steps (1) and (2) of the Example 3A were identical with those in Example 1A.

(3) The polymerization was reaction performed with a free radical polymerization method: nitrogen was continuously introduced, a solution of the initiator 2,2'-[azobis(1-methylethylidene)]bis[4,5-dihydro-1H-imidazole dihydrochloride. (the used amount of water caused that the molar ratio of the 2,2'-[azobis(1-methylethylidene)]bis[4,5-dihydro-1H-imidazole dihydrochloride relative to the total water in the system was 1:2000) was added into the reactor, wherein the molar ratio of the addition amount of the initiator calculated by the 2,2'-[azobis(1-methylethylidene)]bis[4,5-dihydro-1H-imidazole dihydrochloride relative to the raw material A was 2:100, the substances were blended at the stirring speed of 170 rpm and heated to 80° C., and subjected to reaction for 3.5 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 3A.

Examples 4A-6A illustrate the process of RAFT polymerization to modify an ionic liquid.

Example 4A (1) Preparation of an ionic liquid: a raw material A (with a structure represented by the formula

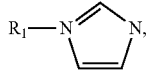

wherein $R_1$ is vinyl) and a raw material B (with a structure of $R_2R_3$, wherein $R_2$ is ethyl, and $R_3$ is bromine) having a molar ratio of 1:1 were added into a three-neck flask, the ingredients were heated to 70° C. under the protection of nitrogen, and subjected to contact reaction for 4 days under the condition of mechanical stirring at a rotational speed of 200 rpm, the mixture was taken out and subjected to rotary evaporation and purification by using ether for 2 days, and vacuum drying for 3 days, so as to obtain the ionic liquid.

(2) The ionic liquid obtained in the step (1) was dissolved in the deionized water according to a weight ratio of 1:5, the solution was then heated to 40° C., and nitrogen was introduced for 30 minutes under the stirring condition to completely remove oxygen.

(3) The polymerization reaction was performed with a RAFT polymerization method: nitrogen was continuously introduced, an initiator 2,2'-azobisisobutyronitrile was added into the reactor, wherein the molar ratio of the addition amount of the initiator relative to the raw material A was 4:100, the nitrogen was continuously introduced for 10 minutes, a chain transfer agent trithiocarbonate was added into the reactor, wherein the molar ratio of the addition amount of the chain transfer agent relative to the raw material A was 0.08:100, the device was sealed in a nitrogen environment, and heated to 80° C., and subjected to reaction for 7 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 4A.

Example 5A

The steps (1) and (2) of the Example 5A were identical with those in Example 1A.

(3) The polymerization reaction was performed with a RAFT polymerization method: nitrogen was continuously introduced, an initiator 2,2'-azobisisoheptonitrile was added into the reactor, wherein the molar ratio of the addition amount of the initiator relative to the raw material A was 3:100, nitrogen was continuously introduced for 10 minutes, a chain transfer agent dithioformate was added into the reactor, wherein the molar ratio of the addition amount of the chain transfer agent relative to the raw material A was 0.05:100, the device was sealed in a nitrogen environment, and heated to 70° C., and subjected to reaction for 8 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 5A.

Example 6A

The steps (1) and (2) of the Example 6A were identical with those in Example 1A.

(3) The polymerization reaction was performed with a RAFT polymerization method: nitrogen was continuously introduced, an initiator 2,2'-azobisisoheptonitrile was added into the reactor, wherein the molar ratio of the addition amount of the initiator relative to the raw material A was 3.5:100, nitrogen was continuously introduced for 10 minutes, a chain transfer agent dithioformate was added into the reactor, wherein the molar ratio of the addition amount of the chain transfer agent relative to the raw material A was 0.1:100, the device was sealed in a nitrogen gas environment, and heated to 90° C., and subjected to reaction for 5 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 6A.

Examples 7A-9A were provided to illustrate the method of modifying an ionic liquid by an ATRP polymerization.

(1) Preparation of an ionic liquid: a raw material A (with a structure represented by the formula

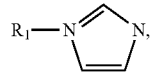

wherein $R_1$ is vinyl) and a raw material B (with a structure of $R_2R_3$, wherein $R_2$ is ethyl, and $R_3$ is bromine) having a molar ratio of 1:1 were added into a three-neck flask, the ingredients were heated to 70° C. under the protection of nitrogen, and subjected to contact reaction for 4 days under the condition of mechanical stirring at a rotational speed of 200 rpm, the mixture was taken out and subjected to rotary evaporation and purification by using ether for 2 days, and vacuum drying for 3 days, so as to obtain the ionic liquid.

(2) The ionic liquid obtained in the step (1) was dissolved in the deionized water according to a weight ratio of 1:3, the solution was then heated to 40° C., and nitrogen was introduced for 30 minutes under the stirring condition to completely remove oxygen.

(3) The polymerization reaction was performed with an ATRP polymerization method: nitrogen was continuously introduced, an initiator α-bromonitrile was added into the reactor, wherein the molar ratio of the addition amount of the initiator relative to the raw material A was 4:100, the nitrogen was continuously introduced for 10 minutes, a catalyst cuprous chloride and a complexing agent cyclopentadiene were added into the reactor, wherein the molar ratio of the addition amounts of the catalyst and the complexing agent relative to the raw material A was 0.4:0.3:100, the device was sealed in a nitrogen environment, and heated to 80° C., and subjected to reaction for 7 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 7A.

Example 8A

The steps (1) and (2) of the Example 8A were identical with those in Example 1A.

(3) The polymerization reaction was performed with an ATRP polymerization method: nitrogen was continuously introduced, an initiator aryl sulfonyl chloride was added into the reactor, wherein the molar ratio of the addition amount of the initiator relative to the raw material A was 3:100, nitrogen was continuously introduced for 10 minutes, a catalyst ferrous bromide and a complexing agent p-isopropyltoluene were subsequently into the reactor, wherein the molar ratio of the addition amounts of the catalyst and the complexing agent relative to the raw material A was 0.1:0.2:100, the device was sealed in a nitrogen environment, and heated to 70° C., and subjected to reaction for 8 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 8A.

Example 9A

The steps (1) and (2) of the Example 6A were identical with those in Example 1A.

(3) The polymerization reaction was performed with an ATRP polymerization method: nitrogen was continuously introduced, an initiator α-chloroketone was added into the reactor, wherein the molar ratio of the addition amount of the initiator relative to the raw material A was 3.5:100, the nitrogen was continuously introduced for 10 minutes, a catalyst ferrous bromide and a complexing agent p-isopropyltoluene were added into the reactor, wherein the molar ratio of the addition amounts of the catalyst and the complexing agent relative to the raw material A was 0.5:0.1:100, the device was sealed in a nitrogen environment, and heated to 90° C., and subjected to reaction for 5 hours and then stopped the reaction.

(4) The product obtained by the reaction was put into a vacuum drying oven at a temperature of 70° C. for drying, the dried product was sheared into blocks and pulverized to obtain the ionic liquid shale inhibitor for drilling fluid, which was marked as the inhibitor 9A.

Examples 10-1A to 10-26A

The preparation method was performed according to the method of Example 1A, except that the groups $R_1$, $R_2$ and $R_3$ of the raw material A and the raw material B were selected according to the content described in Table 1.

The finally prepared ionic liquid shale inhibitor for drilling fluids were marked as the inhibitors 10-1A to 10-26A, respectively.

TABLE 1

| | $R_1$ | $R_2$ | Number of double bonds in $R_1$ and $R_2$ | $R_3$ |
|---|---|---|---|---|
| Examples 1A-9A | —CH=CH$_2$ | —CH$_2$—CH$_3$ | 1 | Br |
| Example 10-1A | —CH=CH$_2$ | —CH$_2$—CH$_2$—CH$_2$—CH$_3$ | 1 | Br |
| Example 10-2A | —CH=CH$_2$ | —CH$_2$—CH$_2$—CH$_3$ | 1 | Br |
| Example 10-3A | —CH=CH$_2$ | —CH(CH$_3$)—CH$_3$ | 1 | Br |
| Example 10-4A | —CH=CH$_2$ | —CH(CH$_3$)$_2$ | 1 | Br |
| Example 10-5A | —CH=CH$_2$ | —CH$_2$—CH(CH$_3$)$_2$ | 1 | Br |
| Example 10-6A | —CH=CH$_2$ | —C(CH$_3$)$_2$—CH$_3$ | 1 | Br |
| Example 10-7A | —CH=CH$_2$ | —CH$_2$—CH$_3$ | 1 | I |
| Example 10-8A | —CH=CH$_2$ | —CH$_2$—CH$_3$ | 1 | Cl |
| Example 10-9A | —CH=CH$_2$ | —CH$_2$—CH$_3$ | 1 | F |
| Example 10-10A | —CH=CH$_2$ | —CH$_2$—CH$_3$ | 1 | BF$_4$ |
| Example 10-11A | —CH=CH$_2$ | —CH$_2$—CH$_3$ | 1 | PF$_6$ |
| Example 10-12A | —CH=CH—CH$_3$ | —CH$_2$—CH$_3$ | 1 | Br |
| Example 10-13A | —CH=CH—CH$_3$ | —CH$_2$—CH$_2$—CH$_2$—CH$_3$ | 1 | Br |
| Example 10-14A | —CH=CH—CH$_3$ | —CH$_2$—CH$_2$—CH$_3$ | 1 | Br |
| Example 10-15A | —CH$_2$—CH=CH$_2$ | —CH$_2$—CH$_3$ | 1 | Br |
| Example 10-16A | —CH$_2$—CH=CH$_2$ | —CH$_2$—CH$_2$—CH$_2$—CH$_3$ | 1 | Br |
| Example 10-17A | —CH$_2$—CH=CH$_2$ | —CH$_2$—CH$_2$—CH$_3$ | 1 | Br |
| Example 10-18A | —CH$_2$—CH=CH—CH$_3$ | —CH$_2$—CH$_3$ | 1 | Br |
| Example 10-19A | —CH$_2$—CH$_2$—CH=CH$_2$ | —CH$_2$—CH$_3$ | 1 | Br |
| Example 10-20A | —CH=CH—CH$_2$—CH$_3$ | —CH$_2$—CH$_3$ | 1 | Br |
| Example 10-21A | —CH=CH—CH=CH$_2$ | —CH$_2$—CH$_3$ | 2 | Br |
| Example 10-22A | —CH=CH$_2$ | —CH=CH$_2$ | 2 | Br |
| Example 10-23A | —CH$_2$—CH$_3$ | —CH=CH$_2$ | 1 | Br |
| Example 10-24A | —(CH$_2$)$_3$—CH=CH$_2$ | —CH$_2$—CH$_3$ | 1 | Br |
| Example 10-25A | —CH=CH—CH=CH$_2$ | —CH=CH$_2$ | 3 | Br |
| Example 10-26A | —CH=CH—CH=CH$_2$ | —CH=CH—CH=CH$_2$ | 4 | Br |

Comparative Example 1AD

It was a commercially available drilling fluid inhibitor manufactured by the Tianjin Hengzhixin Technology Co., Ltd. with a product name of polyamine HX-AMINE, its main component was a mixture of organic amines. The drilling fluid inhibitor was marked as the inhibitor 1 AD.

Comparative Example 2AD

It was a commercially available drilling fluid inhibitor manufactured by the Nanjing Changjiang Jiangyu Grease Co., Ltd. with a product name of polyglycerol, its main component was Polymeric alcohol. The drilling fluid inhibitor was marked as the inhibitor 2 AD.

Comparative Example 3AD

It was a commercially available drilling fluid inhibitor manufactured by the Tianjin Xiongguan Technology Development Co., Ltd. with a product name of INHB-3810, its main component was a mixture of organic amines. The drilling fluid inhibitor was marked as the inhibitor 3AD.

Test Example I

The aforementioned drilling fluid inhibitors were respectively taken and subjected to the following tests:

1. Evaluation of Linear Expansion Effect

1) An inhibitor solution with the concentration of 2 wt % was configured;

2) 5 g of bentonite to be tested (purchased from the Jinan Lanhai Chemical Co., Ltd.) was taken and placed in a measuring cylinder, and compacted for 5 minutes under the condition of a stable pressure of 10 MPa;

3) The measuring cylinder with the compacted rock core was installed on the main machine of a dual-channel shale dilatometer, the sensing center rod was adjusted to be in close contact with the rock core, the number was displayed to be 0.00 by operating the computer software. The recorder was started, 15 mL of the prepared inhibitor solution was slowly added along the side wall of the measuring cylinder.

4) The expansion height was observed and the expanded bentonite can be stabilized after 24 hours, and the expansion height (unit, mm) at this moment (24 hours) was recorded and the results were shown in Table 2.

Explanation: it was generally acknowledged that the higher was the expansion height, it indicated that the poorer was the inhibition performance.

2. Evaluation of the Effect of Inhibiting Slurry Formation 1) 400 mL of a base slurry with a concentration of 4 wt % (ingredients: 4 wt % of bentonite, 0.2 wt % of sodium carbonate, and the balance was water) was taken, 2 wt % of an inhibitor was added, subjected to stirring for 0.5 hour by using a high-speed stirrer, the mixture was taken off, the reading at 600/300 rpm was measured by using a six-speed rotary viscometer at 25° C., and the data was recorded;

2) continuing to add 4 wt % (specifically 16 g, and 16 g was added each time in a repeated process) of bentonite to the system in step 1), subjected to stirring for 0.5 hour by using a high-speed stirrer, the mixture was taken off, the reading at 600/300 rpm was measured by using a six-speed rotary viscometer at 25° C., and the data was recorded;

3) The step 2) was repeated until the reading at 600 rpm was out of the measuring scale.

4) The viscosity measurement instrument was a six-speed viscometer, and the calculation method was as follows:

The apparent viscosity (in an unit of mPa·s) was measured by:

$$\mu_a = 1/2\theta_{600},$$

wherein $\theta_{600}$ represented the reading at the rotational speed of 600 rpm;

The plastic viscosity (in an unit of mPa·s) was measured by:

$$\mu_p = \theta_{600} - \theta_{300},$$

wherein $\theta_{600}$ represented the reading at the rotational speed of 600 rpm, $\theta_{300}$ represented the reading at the rotational speed of 300 rpm;

the dynamic shearing force (in an unit of Pa) was measured by:

$$\tau_0 = 0.511(\theta_{300} - \mu_p),$$

wherein $\theta_{300}$ represented the reading at the rotational speed of 300 rpm, $\mu_p$ represented the plastic viscosity.

It was discovered during the process of recording the data, the data of dynamic shearing force and apparent viscosity exhibited a variation similar to an exponential function, that is, the curve illustrated an initial stage of stabilization period and then a sharp increase showed abruptly. The inhibitors 3A, 4A and 10-7A were taken as examples, the variations of the dynamic shearing force and the apparent viscosity along with the changes of weight concentration of bentonite were shown in Table 3.

TABLE 2

| Weight concentration of bentonite | | 4% | 8% | 12% | 16% | 20% | 24% | 28% | 32% | 36% |
|---|---|---|---|---|---|---|---|---|---|---|
| Dynamic shearing force (Pa) | 3A | 0 | 0 | 0 | 0.511 | 0.511 | 0.511 | 8.176 | 51.611 | |
| | 4A | 0.511 | 0.511 | 0.511 | 0.511 | 0.511 | 4.088 | 53.144 | | |
| | 10-7A | 0.511 | 0.511 | 0.511 | 1.533 | 8.687 | 57.232 | | | |
| Apparent viscosity (mPa · s) | 3A | 4 | 4 | 4 | 4.5 | 4.5 | 5.5 | 18 | 69.5 | |
| | 4A | 4.5 | 4.5 | 4.5 | 4.5 | 4.5 | 14 | 59 | | |
| | 10-7A | 4.5 | 4.5 | 4.5 | 8.5 | 23.5 | 75 | | | |

As can be seen from Table 2, in regard to the inhibitors 3A, 4A and 10-7A, there was a sharp rise in the dynamic shearing force when the weight concentration of bentonite reached 28 wt %, 24 wt %, 20 wt %, respectively; the apparent viscosity suddenly increased when the weight concentration of bentonite reached 28 wt %, 24 wt %, and 20 wt %, respectively. For the sake of facilitating the recording process, only the numerical values of dynamic shearing force and apparent viscosity of the bentonite content at 4 wt % and 16 wt % were recorded for other inhibitors, and the inflection points was recorded, and the recording results were shown in Table 3.

3. Evaluation of Rolling Recovery Effect

1) The rock debris was screened with (6-10) meshes, 20 g of the screened rock debris was weighted by using a balance, 350 ml of ionic liquid inhibitor solution with required concentrations (1 wt % and 2 wt % of concentration were respectively prepared) were by using a high-speed variable frequency stirrer, the rock debris and the solution were added into an aging tank, and the aging tank was sealed;

2) The aging tank was put into a roller heating furnace and heating to 120° C., and subjected to rolling for 16 hours, the aging tank was taken out, and cooled to room temperature by using the tap water;

3) the sample liquid and the rock debris in the aging tank were poured into a 40-mesh standard sieve, and subjected to a wet method sieving and washing for about 1 min, the residual rock debris was placed in a watch glass;

4) The watch glass containing the rock debris was then subjected to drying in a drying oven at a temperature of 105° C., the watch glass was subsequently taken out for cooling, the watch glass was placed in air for 24 hours and weighed, and the mass in of the recovered rock debris was recorded.

5) The rolling recovery calculation method was follows:

$$R = m \div 20 \times 100\%$$

Wherein R represented a rolling recovery rate; in represented the quality of the recovered rock debris.

The results of the rolling recovery rate (%) of the ionic liquid inhibitor solutions having a concentration of 1 wt % and 2 wt % after hot rolling at 120° C. were shown in Table 3.

TABLE 3

| | Expansion height (mm) | Dynamic shearing force | | Inflection point (wt %) | Apparent viscosity | | Inflection point (wt %) | Rolling recovery rate (%) | |
|---|---|---|---|---|---|---|---|---|---|
| | | 4 wt % (Pa) | 16 wt % (Pa) | | 4 wt % (mPa·s) | 16 wt % (mPa·s) | | 1 wt % | 2 wt % |
| 1A | 2.6 | 0 | 0.511 | 24 | 5 | 5 | 24 | 51.29 | 73.23 |
| 2A | 2.6 | 0 | 0.511 | 24 | 4.5 | 4.5 | 24 | 50.38 | 73.55 |
| 3A | 2.5 | 0 | 0.511 | 28 | 4 | 4 | 28 | 52.98 | 75.32 |
| 4A | 2.7 | 0 | 0.511 | 24 | 5 | 5 | 24 | 50.28 | 73.23 |
| 5A | 2.6 | 0 | 0.511 | 24 | 6 | 6 | 24 | 51.79 | 71.23 |
| 6A | 2.9 | 0 | 0.511 | 24 | 5 | 5 | 24 | 51.33 | 71.89 |
| 7A | 2.6 | 0 | 0.511 | 24 | 5.5 | 5.5 | 24 | 50.96 | 72.75 |
| 8A | 2.7 | 0 | 0.511 | 24 | 5.5 | 5.5 | 24 | 51.23 | 70.98 |
| 9A | 2.8 | 0 | 0.511 | 24 | 6 | 6 | 24 | 50.67 | 71.88 |
| 10-1A | 3.1 | 0 | 0.511 | 24 | 4 | 4 | 24 | 50.98 | 73.32 |
| 10-2A | 4.3 | 0.511 | 5.621 | 20 | 7 | 10 | 20 | 49.98 | 71.32 |
| 10-3A | 4.2 | 0.511 | 5.621 | 20 | 8 | 10 | 20 | 49.98 | 71.32 |
| 10-4A | 4.3 | 0.511 | 5.621 | 20 | 7 | 11 | 20 | 49.98 | 71.32 |
| 10-5A | 4.3 | 0.511 | 5.621 | 20 | 7 | 12 | 20 | 49.98 | 71.32 |
| 10-6A | 4.4 | 0.511 | 5.621 | 20 | 8 | 11 | 20 | 49.98 | 71.32 |
| 10-7A | 3.7 | 0.511 | 6.132 | 16 | 7 | 12 | 16 | 32.22 | 50.69 |
| 10-8A | 3.9 | 0.511 | 9.198 | 16 | 8.5 | 12 | 16 | 35.32 | 52.76 |
| 10-9A | 4.2 | 0.511 | 9.198 | 16 | 8.5 | 15 | 16 | 36.33 | 51.66 |
| 10-10A | 4.4 | 1.022 | 21.973 | 16 | 13.5 | 33.5 | 16 | 32.15 | 49.89 |
| 10-11A | 5.5 | 0.511 | 41.902 | 16 | 15 | 34.5 | 16 | 31.62 | 48.23 |
| 10-12A | 4 | 1.022 | 5.621 | 20 | 7 | 12 | 20 | 45.69 | 62.13 |
| 10-13A | 4.5 | 0.511 | 6.132 | 20 | 8 | 12.5 | 20 | 47.26 | 63.63 |
| 10-14A | 4.6 | 0.511 | 9.198 | 20 | 7 | 12 | 20 | 43.23 | 64.59 |
| 10-15A | 4.6 | 0.511 | 6.132 | 20 | 9.5 | 11.5 | 20 | 49.87 | 64.48 |
| 10-16A | 4.8 | 0.511 | 9.198 | 16 | 7 | 12 | 16 | 42.11 | 66.25 |
| 10-17A | 4.9 | 1.022 | 5.621 | 20 | 8.5 | 10.5 | 20 | 44.97 | 67.98 |
| 10-18A | 4.8 | 0.511 | 6.132 | 16 | 9 | 12 | 16 | 41.25 | 67.48 |
| 10-19A | 4.7 | 1.022 | 6.132 | 20 | 8.5 | 12 | 20 | 43.98 | 61.26 |
| 10-20A | 4.6 | 1.022 | 9.198 | 20 | 9 | 13.5 | 20 | 47.62 | 62.36 |
| 10-21A | 4.9 | 0.511 | 6.132 | 20 | 7 | 12 | 20 | 39.89 | 55.69 |
| 10-22A | 4.9 | 0.511 | 9.198 | 20 | 9.5 | 11.5 | 20 | 38.88 | 53.89 |
| 10-23A | 4.8 | 0.511 | 6.132 | 16 | 7 | 12 | 16 | 40.33 | 58.66 |
| 10-24A | 4.7 | 0.511 | 9.198 | 20 | 8.5 | 10.5 | 20 | 41.89 | 60.01 |
| 10-25A | 4.7 | 1.022 | 5.621 | 20 | 9 | 12 | 20 | 41.56 | 59.32 |
| 1AD | 3.6 | 0.511 | 3.577 | 20 | 4.5 | 8 | 20 | 45.69 | 66.23 |
| 2AD | 3.7 | 0.511 | 3.066 | 20 | 5 | 8.5 | 20 | 42.32 | 65.32 |
| 3AD | 3.6 | 1.022 | 4.599 | 16 | 5 | 9 | 16 | 41.33 | 62.21 |

As can be seen from Table 3, the ionic liquid shale inhibitor for drilling fluid of the present disclosure has lower expansion height, and dynamic shearing force, and can tolerate higher bentonite concentration, lower apparent viscosity and can withstand higher bentonite concentration, and has higher rolling recovery rate after subjecting to the hot rolling at 120° C.; the comprehensive properties of the ionic liquid shale inhibitor for drilling fluid of the present disclosure are obviously higher than those of the drilling fluid inhibitors commercially available in the Comparative Examples.

The preferred embodiments of the present disclosure have been described above in detail, but the present disclosure is not limited thereto. Within the scope of the technical idea of the present disclosure, many simple modifications can be made to the technical solution of the present disclosure, including various technical features being combined in any other suitable way, and these simple modifications and combinations should also be regarded as the disclosure of the present disclosure, and all fall within the scope of the present disclosure.

The invention claimed is:

1. A method of preparing an ionic liquid shale inhibitor for drilling fluid, the method comprising the following steps:
   subjecting an imidazole-based ionic liquid to a polymerization reaction in water environment under an inert atmosphere to produce a polymer, the produced polymer is used as the ionic liquid shale inhibitor for drilling fluid,
   wherein the imidazole-based ionic liquid is obtained through the following process: subjecting a raw material A and a raw material B to a contact reaction under an inert atmosphere, the structural formula of the raw material A is

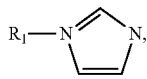

the structural formula of the raw material B is $R_2R_3$, and $R_3$ is an anionic unit;
   wherein the imidazole-based ionic liquid comprises a cationic unit and the anionic unit, wherein the cationic unit has a structural formula

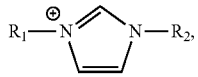

wherein $R_1$ is selected from the group consisting of —CH=CH—CH$_2$—CH$_3$, —CH$_2$—CH—CH$_3$, —CH$_2$—CH$_2$—CH=CH$_2$, —CH=CH—CH=CH$_2$, —C(CH$_3$)=CH—CH$_3$, —CH=C(CH$_3$)$_2$, —(CH$_2$)$_2$—CH=CH$_2$, —CH$_2$—C(CH$_3$)=CH$_2$, —CH=CH—CH$_3$, —CH$_2$—CH=CH$_2$, —C(CH$_3$)=CH$_2$ and —CH=CH$_2$,
   wherein $R_2$ is selected from the group consisting of —CH$_2$—CH$_2$—CH$_2$—CH$_3$, —CH$_2$—CH(CH$_3$)$_2$, —C(CH$_3$)$_2$—CH$_3$, —CH$_2$—CH$_2$—CH$_3$, —CH(CH$_3$)$_2$, —CH(CH$_3$)—CH$_3$ and —CH$_2$—CH$_3$,
   wherein $R_3$ is one or more selected from the group consisting of halide ion, fluorine-containing inorganic acid ion, fluorine-containing imine ions, carbonate ion and bicarbonate ion,
   wherein a polymerization reaction mode is selected from the group consisting of a RAFT polymerization and an ATRP polymerization,
   wherein the polymer has a degree of polymerization within a range of 40-200 and a viscosity of (2-10) mPa·s at a temperature of 25° C.

2. The method of claim 1, wherein $R_1$ is selected from the group consisting of —CH=CH—CH$_2$—CH$_3$, —CH$_2$—CH=CH—CH$_3$, —CH$_2$—CH$_2$—CH=CH$_2$, —CH=CH—CH=CH$_2$, —CH=CH—CH$_3$, —CH$_2$—CH=CH$_2$ and —CH=CH$_2$;
   $R_2$ is selected from the group consisting of —CH$_2$—CH$_2$—CH$_2$—CH$_3$, —CH$_2$—CH$_2$—CH$_3$ and —CH$_2$—CH$_3$.

3. The method of claim 1, wherein $R_1$ is —CH=CH$_2$; $R_2$ is —CH$_2$—CH$_2$—CH$_2$—CH$_3$ or —CH$_2$—CH$_3$.

4. The method of claim 1, wherein $R_1$ and $R_2$ in the cationic unit

are selected from the group consisting of the following combinations of structural formula:

| | |
|---|---|
| $R_1$ is —CH=CH$_2$, $R_2$ is —CH$_2$—CH$_3$; | (Formula 1') |
| $R_1$ is —CH=CH$_2$, $R_2$ is —CH$_2$—CH$_2$—CH$_2$—CH$_3$; | (Formula 2') |
| $R_1$ is —CH=CH$_2$, $R_2$ is —CH$_2$—CH$_2$—CH$_3$; | (Formula 3') |
| $R_1$ is —CH=CH$_2$, $R_2$ is —CH(CH$_3$)—CH$_3$; | (Formula 4') |
| $R_1$ is —CH=CH$_2$, $R_2$ is —CH(CH$_3$)$_2$; | (Formula 5') |
| $R_1$ is —CH=CH$_2$, $R_2$ is —CH$_2$—CH(CH$_3$)$_2$; | (Formula 6') |
| $R_1$ is —CH=CH$_2$, $R_2$ is —C(CH$_3$)$_2$—CH$_3$; | (Formula 7') |
| $R_1$ is —CH=CH—CH$_3$, $R_2$ is —CH$_2$—CH$_3$; | (Formula 8') |
| $R_1$ is —C(CH$_3$)=CH$_2$, $R_2$ is —CH$_2$—CH$_3$; | (Formula 9') |
| $R_1$ is —CH$_2$—CH=CH$_2$, $R_2$ is —CH$_2$—CH$_3$; | (Formula 10') |
| $R_1$ is —CH$_2$—C(CH$_3$)=CH$_2$, $R_2$ is —CH$_2$—CH$_3$; | (Formula 11') |
| $R_1$ is —(CH$_2$)$_2$—CH=CH$_2$, $R_2$ is —CH$_2$—CH$_3$; | (Formula 12') |
| $R_1$ is —CH=C(CH$_3$)$_2$, $R_2$ is —CH$_2$—CH$_3$; | (Formula 13') |
| $R_1$ is —C(CH$_3$)=CH—CH$_3$, $R_2$ is —CH$_2$—CH$_3$; | (Formula 14') |
| $R_1$ is —CH=CH—CH=CH$_2$, $R_2$ is —CH$_2$—CH$_3$; | (Formula 15') |
| $R_1$ is —CH$_2$—CH$_2$—CH=CH$_2$, $R_2$ is —CH$_2$—CH$_3$; | (Formula 16') |
| $R_1$ is —CH$_2$—CH=CH—CH$_3$, $R_2$ is —CH$_2$—CH$_3$; | (Formula 17') |
| $R_1$ is —CH=CH—CH$_2$—CH$_3$, $R_2$ is —CH$_2$—CH$_3$; | (Formula 18') |
| $R_1$ is —CH=CH—CH$_3$, $R_2$ is —CH$_2$—CH$_2$—CH$_2$—CH$_3$; | (Formula 19') |
| $R_1$ is —CH=CH—CH$_3$, $R_2$ is —CH$_2$—CH$_2$—CH$_3$; | (Formula 20') |
| $R_1$ is —CH$_2$—CH=CH$_2$, $R_2$ is —CH$_2$—CH$_2$—CH$_2$—CH$_3$; | (Formula 21') |
| $R_1$ is —CH$_2$—CH=CH$_2$, $R_2$ is —CH$_2$—CH$_2$—CH$_3$; | (Formula 22') |
| $R_1$ is —CH=CH$_2$, $R_2$ is —CH=CH$_2$; | (Formula 23') |
| $R_1$ is —CH$_2$—CH$_3$, $R_2$ is —CH=CH$_2$. | (Formula 24') |

5. The method of claim 1, wherein $R_3$ is one or more selected from the group consisting of hexafluorophosphate ion, tetrafluoroborate ion, bis(trifluoromethane sulfonamide) ion, bromide ion, iodide ion, fluoride ion, chloride ion and bicarbonate ion.

6. The method of claim 1, wherein $R_3$ is one or more selected from the group consisting of bromide ion, iodide ion, fluoride ion, chloride ion, tetrafluoroborate ion and hexafluorophosphate ion.

7. The method of claim 1, wherein $R_3$ is one or more selected from the group consisting of bromide ion, iodide ion and chloride ion.

8. The method of claim 1, wherein $R_3$ is bromide ion.

9. The method of claim 1, wherein $R_1$ is vinyl, $R_2$ is ethyl or butyl, and $R_3$ s bromide ion.

10. The method according to claim 1 wherein a molar ratio of the raw material A relative to the raw material B is 1:0.8-1.2;

the conditions of the contact reaction comprise: the reaction temperature is within a range of 50-90° C., the reaction time is within a range of 2-5 days;

the method further comprises: purifying and drying a material obtained by the contact reaction so as to prepare the imidazole-based ionic liquid.

11. The method of claim 1, wherein the method comprises: initially dissolving the imidazole-based ionic liquid in water, and then carrying out the polymerization reaction in an inert atmosphere;

the weight ratio of the imidazole-based ionic liquid relative to water is within a range of 1:3-5;

before the polymerization reaction is carried out, an inert gas is introduced into a mixed solution of the imidazole-based ionic liquid and the water to remove oxygen.

12. The method of claim 1, wherein a process of the RAFT polymerization comprises:

subjecting the imidazole-based ionic liquid to the polymerization reaction in a sealed environment at the temperature of 70-90° C. for 5-8h under an inert atmosphere and in the presence of a RAFT initiator and a chain transfer agent;

a molar ratio of the imidazole-based ionic liquid, the RAFT initiator and the chain transfer agent is 100:0.05-10:0.03-0.3;

the RAFT initiator is one or more selected from 2,2'-azobisisobutyronitrile, 2,2'-azobisisoheptonitrile, potassium persulfate and dibenzoyl peroxide;

the chain transfer agent is one or more selected from the group consisting of trithiocarbonate, dithioformate and dithiocarbamate.

13. The method of claim 1, wherein a process of the ATRP polymerization comprises: subjecting the imidazole-based ionic liquid to the polymerization reaction in a sealed environment at the temperature of 70-90° C. for 5-8 h under an inert atmosphere and in the presence of an ATRP initiator, a catalyst and a complexing agent;

a molar ratio of the imidazole-based ionic liquid, the ATRP initiator, the catalyst and the complexing agent is 100:0.05-10:0.05-1:0.05-0.6;

the ATRP initiator is one or more selected from the group consisting of benzyl halide, α-bromo ester, α-haloketone, α-halonitrile, arylsulfonylchloride and 2,2'-azobisisobutyronitrile;

the catalyst is one or more selected from the group consisting of cuprous chloride, cuprous bromide, ferrous chloride and ferrous bromide;

the complexing agent is one or more selected from the group consisting of 2,2'-bipyridine, p-isopropyltoluene, cyclopentadiene, phenol and formic acid.

\* \* \* \* \*